Oct. 9, 1928.
A. W. MEYER
1,687,345
COFFEE MAKING APPARATUS
Filed Nov. 28, 1927      2 Sheets-Sheet 1
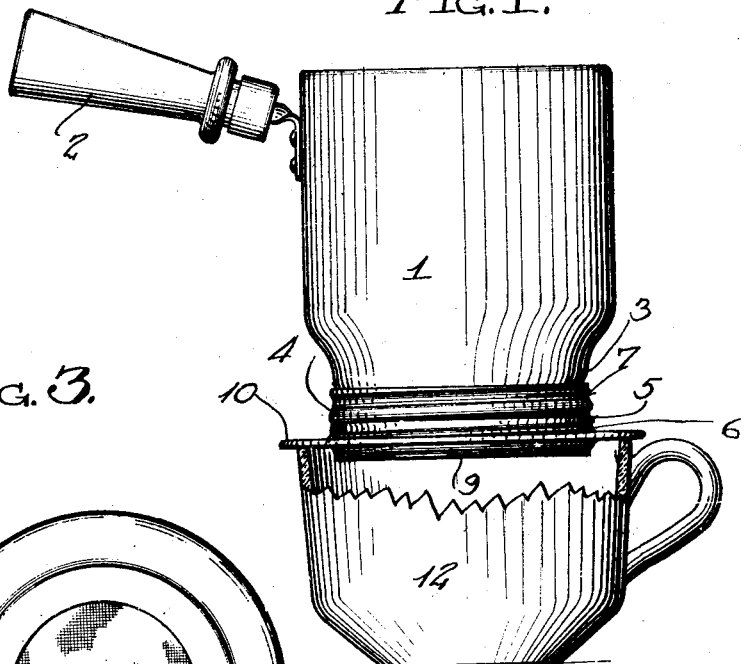
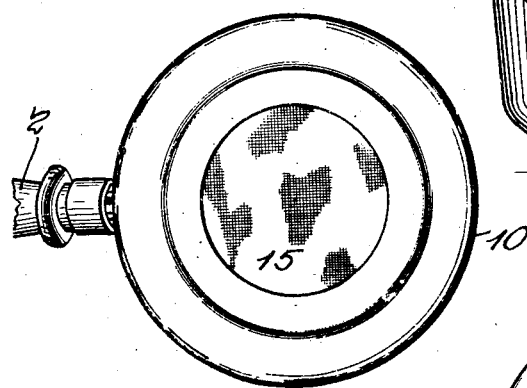
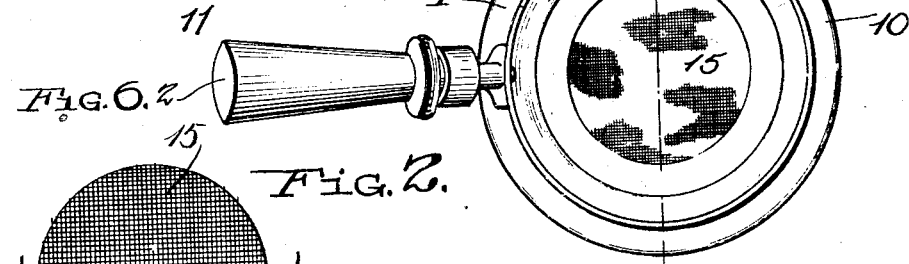
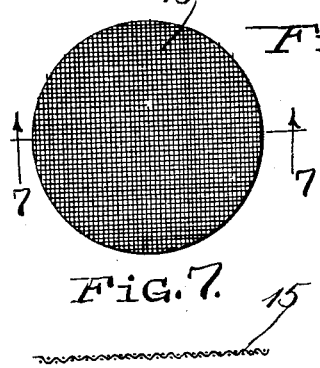
INVENTOR.
Albert W. Meyer
BY
E. H. Bond
ATTORNEY.

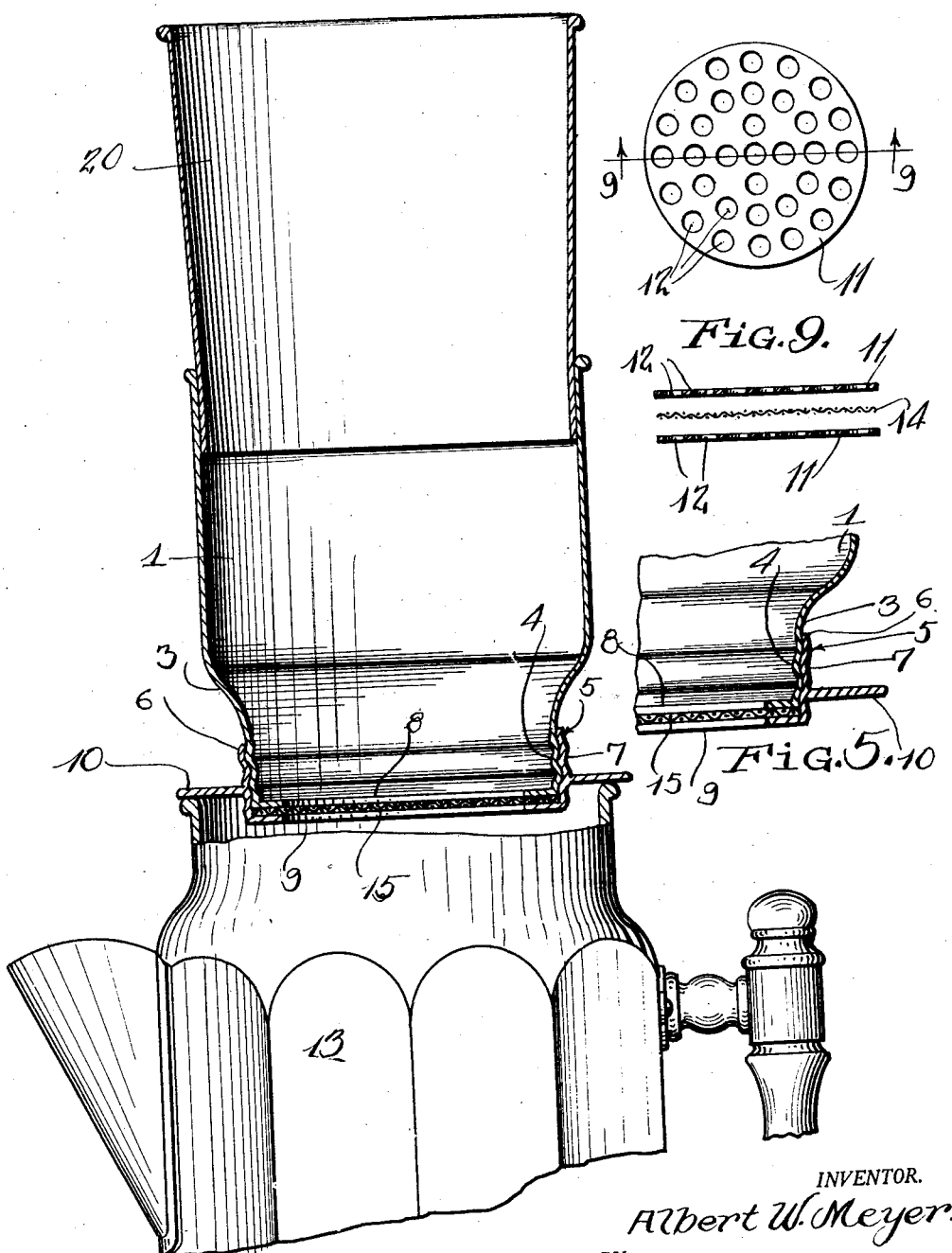

Patented Oct. 9, 1928.

1,687,345

UNITED STATES PATENT OFFICE.

ALBERT W. MEYER, OF NEW YORK, N. Y.

COFFEE-MAKING APPARATUS.

Application filed November 28, 1927. Serial No. 236,291.

This invention relates to certain new and useful improvements in coffee making apparatus, and more particularly to coffee making apparatus of that class in which is provided a percolator for coffee pots, urns or similar vessels, and so constructed and arranged that coffee may be made practically instantaneous and in a cleanly and efficient manner.

The present invention is designed as an improvement upon some of my prior patents along this line, among others of which may be mentioned Nos. 1,462,610 and 1,549,043.

The present invention has for its object and others to provide a simplified device of this character readily applied or used in connection with a coffee pot, an urn or an individual cup.

The present invention also provides for the making of one or more cups of coffee as may be desired, the containers being adapted to be inter-engaged one with another, liquid tight.

One of the primary objects, however, of the present invention is the provision of a novel form of strainer having provision for keeping the cloth or foraminous material practically taut, so as to prevent sagging thereof in use.

The strainer is removably connected with the container thus providing for its quick and ready removal when desired, when the strainer and the part by which it is carried may be quickly and easily cleaned, ready for instant use for the making of another cup or quantity of coffee.

Other objects and advantages of the invention will hereinafter appear, and the novel features thereof will be particularly pointed out in the appended claims.

The invention in its preferred form is clearly illustrated in the accompanying drawings which, with the numerals of reference marked thereon form a part of this specification, and in which:

Figure 1 is an elevation with parts broken away showing my present improvement as applied to an individual cup.

Figure 2 is a top plan view of Figure 1.

Figure 3 is a bottom plan of Figure 2.

Figure 4 is an elevation showing the coffee pot broken away and with parts in section, a multiple container mounted thereupon, the latter being shown in vertical section, the section being taken on the line 4—4 of Figure 2.

Figure 5 is a sectional detail showing the strainer and its allied parts.

Figure 6 is a face view of a strainer disk which may be a woven fabric of wire or other fibre, as cotton, or linen.

Figure 7 is a cross section of the same on the line 7—7 in Figure 6.

Figure 8 is a face view of a pair of metal disks provided with large holes.

Figure 9 is a cross section of such pair of disks with a disk of filter paper between them, the disks being shown, for clearness, as separated from each other. The line of section is indicated at 9—9 in Figure 8.

Like numerals of reference indicate like parts throughout the several views.

I will first describe my novel container and its strainer and give a brief description of the mode of use.

Referring to the drawings, 1 designates a container, or coffee grain compartment or vessel provided with a suitable handle 2, the lower portion of said container in this instance being shown as of less diameter, although this is not necessary, while preferred, and this reduced portion 3 is externally threaded as shown at 4 for detachable threaded and liquid tight engagement with the upstanding flange 5 of the member 6 with threads 7 of which cooperate with and form a liquid tight joint with said threads 4, as will be clearly understood upon reference to Figures 4 and 5.

The member 6 may be constructed in any suitable manner of a single piece as shown or of more or less parts, the functions being the same under all conditions. In the present instance it is shown as having an inwardly extending horizontal flange 8, see Figure 4, which rests upon the percolator 15 which in turn rests upon an inwardly extending flange 9 on the member 6, the percolator 15 being firmly retained in position between the flanges 8 and 9.

The container is removably supported by the outwardly extending flange 10 on the member 6 upon the upper edge of an individual cup 12, as seen in Figure 1, or of a coffee pot 13 as seen in Figure 4, or, when desired it may be used in connection with an urn.

The percolator may be readily removed at any time for cleaning or other purpose by simply unscrewing the member 6, removing the percolator 15 and the latter cleaned, or a new one installed whenever necessary.

It is to be understood that the container has no bottom wall, the latter being furnished by the percolator.

In use the container 1 equipped as above described is placed upon a cup as 12 or a coffee pot 13 or in fact any other receptacle and the coffee placed upon the percolator and then boiling water placed in the container. Practically instantaneous coffee can be prepared in the foregoing manner. A cover may be placed upon the container, if desired, to retain the steam which aids materially in the making of the coffee.

In use the container may be placed upon an individual cup, as in Figure 1, or upon the coffee pot 13, as seen in Figure 4, and if it be desired to make more than one cup of coffee or a larger amount of coffee than may be made with the one container, I provide additional containers as 20 adapted to snugly fit one within the other, as seen in said Figure 4, the result being obvious.

The percolator may be variously constructed. As shown in Figures 2, 3, 4, 5, 6 and 7, it comprises a circular disk 15 of closely woven wire cloth or other fabric adapted to be received in the member 6 and firmly grasped along its peripheral margin between the flanges 8 and 9 where the member 6 is screwed tightly upon the screw threads 4 of the container, and is thus held strongly distended. The fabric may be of silk, cotton, linen or other fibre adapted to be readily cleansed after use.

As shown in Figures 8 and 9, the percolator consists of two disks 11, preferably of metal having large perforations 12 to form circular open-work grids, and a disk 14 of filter paper introduced and held between the grids, the whole supported between the flanges 8 and 9 as will be understood.

It will be apparent that other modifications and details may be resorted to without departing from the spirit of the invention or sacrificing any of its advantages.

What is claimed as new is:—

1. In a coffee making device, a container, a supporting member having screw threaded liquid tight removable engagement therewith, and a percolator member supported upon said supporting member and removably held by the container.

2. In a coffee making apparatus, a flanged member adapted to be supported upon the upper edge of a receptacle, an annular member mounted upon said supporting member, a percolator supported thereby, and a retaining ring secured to the percolator member to hold the same in stretched condition.

3. In a coffee making apparatus, a member having a reticulated portion, a percolator fabric having a surrounding edge retained by an annular disposed member, and a clamping member cooperable therewith.

4. A coffee making apparatus comprising a container with screw threaded annular portion at its lower end, and a cooperating percolator receiving member, and an intermediate member having the foraminous portion permanently retained in stretched position within the first named member.

5. In a coffee making apparatus, a container with foraminous bottom portion, and an extension for said container adapted for removable insertion therein to vary the capacity of the container.

6. In a coffee making apparatus, a container supporting member comprising a portion for removable support upon a receptacle and having an inwardly extended flange, a removable flanged member for cooperation therewith, a percolator cloth with peripheral stretching means, and a member removably supported upon said cloth and said flange.

In testimony whereof I affix my signature.

ALBERT W. MEYER.